United States Patent Office 3,442,943
Patented May 6, 1969

3,442,943
PROCESS FOR PREPARING
6-DEOXYTETRACYCLINES
Michael Joseph Martell, Jr., Pearl River, and Adma
Schneller Ross, Suffern, N.Y., assignors to American Cyanamid Company, Stamford, Conn., a corporation of Maine
No Drawing. Filed Aug. 16, 1967, Ser. No. 660,921
Int. Cl. C07c 103/19
U.S. Cl. 260—559                                 4 Claims

ABSTRACT OF THE DISCLOSURE

This disclosure describes a process for the conversion of 2 - carboxamido-N-amidomethyl-6-deoxytetracyclines and 2 - carboxamido-N-imidomethyl-6-deoxytetracyclines to the corresponding 6-deoxytetracyclines under mild basic conditions.

BRIEF SUMMARY OF THE INVENTION

This invention relates to a novel process for preparing 6-deoxytetracyclines having the following general formula:

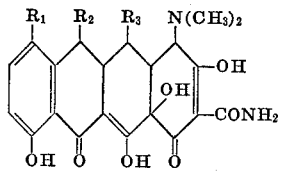

wherein $R_1$ is hydrogen or halogen, $R_2$ is hydrogen or methyl, and $R_3$ is hydrogen or hydroxy with the proviso that when $R_3$ is hydroxy then $R_2$ must be methyl. More particularly, the present invention comprises treating a 2-carboxamido-N-amidomethyl-6-deoxytetracycline or a 2-carboxamido-N-imidomethyl - 6 - deoxytetracycline which may be represented by the following general formula:

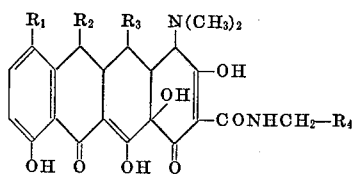

wherein $R_1$, $R_2$ and $R_3$ are as hereinbefore defined and $R_4$ is selected from the group consisting of —NHCOCF$_3$,

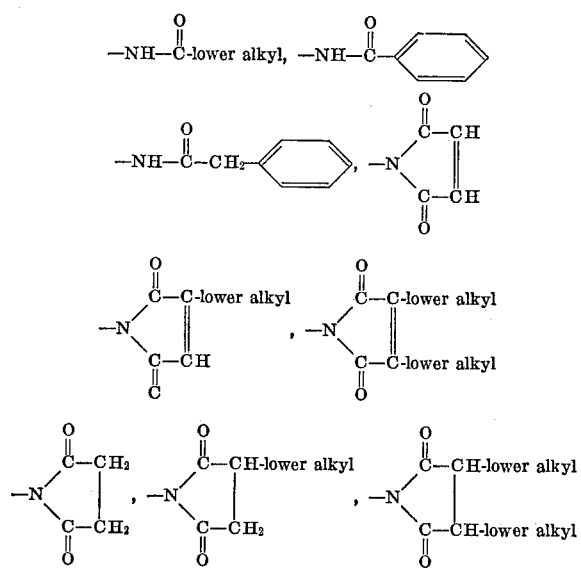

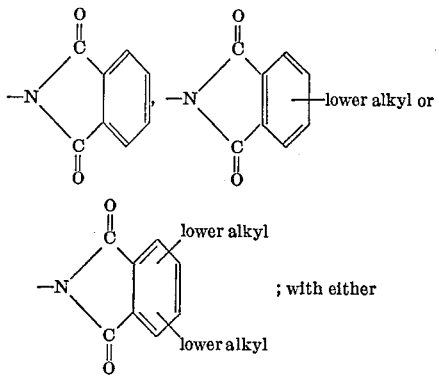

(A) a primary lower aliphatic amine in a lower alkanol as solvent, or
(B) 0.05 N to 0.50 N aqueous sodium hydroxide.

DETAILED DESCRIPTION OF THE INVENTION

In the general formulae set forth above, suitable lower alkyl groups are those having up to about 4 carbon atoms whereas halogen is exemplified by chlorine and bromine. Suitable primary lower aliphatic amines contemplated by the present invention are those having from 3 to 5 carbon atoms such as, for example, n-propylamine, isopropylamine, n-butylamine, isobutylamine, n-amylamine, etc. Suitable lower alkanols contemplated by the present invention are those having up to 4 carbon atoms such as, for example, methanol, ethanol, isopropanol, sec.-butanol, and the like. The starting materials for the novel process of the present invention may be readily prepared by the interaction of an appropriate 2-decarboxamido-2-cyano-6-deoxytetracycline and an N-hydroxymethylamide or N-hydroxymethylimide as is set forth in U.S. Patent No. 3,275,652 to Martell et al.

In practicing the novel process (A) of the present invention at least one molar equivalent of primary lower aliphatic amine should be employed per mole of tetracycline starting material. The use of a stoichiometric excess of primary lower aliphatic amine is preferred, however, since an excess results in somewhat higher yields of 6-deoxytetracycline product. The amount of lower alkanol solvent to be employed in process (A) is a matter of convenience depending upon the solubility of the tetracycline starting material therein. In practicing the novel process (B) of the present invention at least one molar equivalent of sodium hydroxide should be employed per mole of tetracycline starting material. The use of a stoichiometric excess of sodium hydroxide is preferred, however, since an excess results in somewhat higher yields of 6-deoxytetracycline product. Although the concentration of aqueous sodium hydroxide employed may be from 0.05 N to 0.50 N, it is preferred to employ about 0.10 N aqueous sodium hydroxide.

Temperature is not a critical factor. Temperatures of from about 50° C. to about 110° C. can be employed although a range of from about 65° C. to about 95° C. is preferred. In the case of process (A), the reflux temperature of the lower alkanol solvent may be conveniently employed whereas in the case of process (B), steam bath temperature is preferred. The time of reaction is likewise not a critical factor. The time necessary to obtain substantially complete reaction varies, of course, with the reaction temperature and the reactivity of the particular tetracycline starting material. In the preferred temperature range of from about 65° C. to about 95° C., a reaction period of from about 15 minutes to about 5 hours results in substantial conversion to the 6-deoxytetracycline product.

The products of the novel process of the present invention are recovered from the reaction mixtures by conventional methods. For example, in the case of process (A), the products may be isolated by precipitation with a solvent such as diethyl ether or hexane or by concentration, usually under reduced pressure, or by a combination of these. In the case of process (B), work-up of the reaction mixtures to obtain the desired product may also be accomplished by known procedures such as concentration, solvent extraction or a combination of these procedures. After isolation, the products may be purified by any of the generally known methods for purification of tetracycline derivatives. These include recrystallization from various solvents and mixed solvent systems, chromatography and counter-current distribution, all of which are usefully employed for this purpose.

The novel process of the present invention is useful for the conversion of a tetracycline moiety having a cyano group at the 2-position to the corresponding tetracycline moiety having a carboxamido group at the 2-position. It is well known in the art that many reactions may be effected on a tetracycline nucleus having a cyano group at the 2-position which cannot be successfully carried out when a carboxamido group is at the 2-position. Therefore, a tetracycline having a 2-carboxamido group may be converted by known procedures to the corresponding tetracycline having a 2-cyano group, the desired reactions may be carried out, and the resulting product may be converted back to the corresponding tetracycline having a 2-carboxamido group. This last conversion is actually a 2-step process involving first the condensation of the 2-cyano compound with an N-hydroxymethylamide or N-hydroxymethylimide to form the intermediate 2-carboxamido-N-amidomethyl-6-deoxytetracycline or 2-carboxamido-N-imidomethyl-6-deoxytetracycline which is then hydrolyzed to the corresponding 6-deoxytetracycline having a 2-carboxamido group. This last hydrolysis has heretofore always been carried out under severe acidic conditions which gave low yields and presented difficult problems of isolation. The novel process of the present invention now makes it possible to carry out this last conversion from the 2-carboxamido-N-alkylated derivatives to the parent 2-carboxamido derivatives under mild basic conditions giving good yields with much greater ease of isolation.

The invention will be described in greater detail in conjunction with the following specific examples.

EXAMPLE 1

Conversion of 2-carboxamido-N-phthalimidomethyl-6-demethyl-6-deoxytetracycline to 6-demethyl-6-deoxytetracycline A solution of 58 milligrams (0.1 millimole) of 2-carboxamido-N-phthalimidomethyl-6-demethyl - 6 - deoxytetracycline in 25 milliliters of methanol and 0.15 milliliter of n-butylamine was refluxed for 5 hours. The solution was evaporated to dryness, triturated with ether and the solid filtered off and dried (36 milligrams). Paper chromatography (n-butanol-phosphate buffer pH 2.0) showed the presence of 6-demethyl-6-deoxytetracycline.

EXAMPLE 2

Conversion of 2-carboxamido - N - trifluoroacetamidomethyl-6-demethyl-6-deoxytetracycline to 6-demethyl-6-deoxytetracycline A solution of 2.8 mg. (0.05 mmole) of 2-carboxamido-N-trifluoroacetamidomethyl-6-demethyl - 6 - deoxytetracycline in 0.15 ml. (0.15 mmole) of 0.1 N sodium hydroxide solution was warmed in a water bath at 60–70° C. for 20 minutes. The solution was diluted with 0.85 ml. of 0.1 N methanolic hydrochloric acid and spotted on two paper chromatographic systems which showed the presence of 6-demethyl-6-deoxytetracycline.

What is claimed is:
1. The process of preparing compounds of the formula:

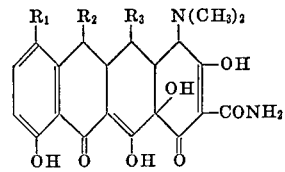

wherein $R_1$ is selected from the group consisting of hydrogen and halogen, $R_2$ is selected from the group consisting of hydrogen and methyl, and $R_3$ is selected from the group consisting of hydrogen and hydroxy with the proviso that when $R_3$ is hydroxy then $R_2$ is methyl; which comprises contacting a compound of the formula:

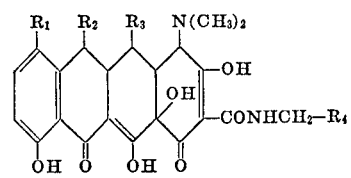

wherein $R_1$, $R_2$ and $R_3$ are as hereinabove defined and $R_4$ is selected from the group consisting of —NHCOCF$_3$,

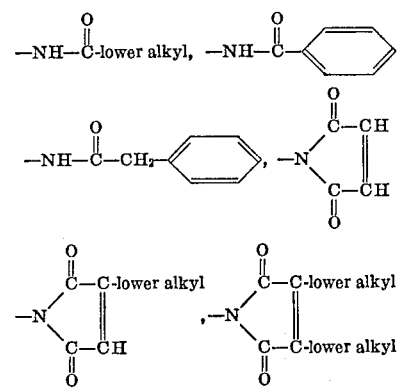

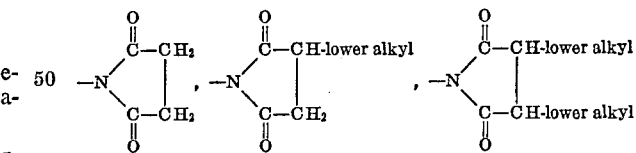

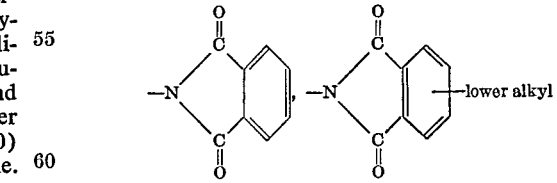

and

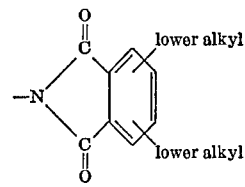

with a primary lower aliphatic amine in a lower alkanol solvent.

2. A process according to claim 1 wherein $R_1$, $R_2$ and $R_3$ are hydrogen; $R_4$ is phthalimido; the primary lower aliphatic amine is n-butylamine; and the lower alkanol solvent is methanol.

3. The process of preparing compounds of the formula:

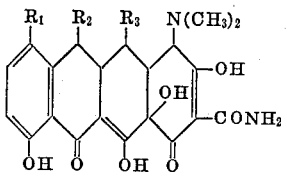

wherein $R_1$ is selected from the group consisting of hydrogen and halogen, $R_2$ is selected from the group consisting of hydrogen and methyl, and $R_3$ is selected from the group consisting of hydrogen and hydroxy with the proviso that when $R_3$ is hydroxy then $R_2$ is methyl; which comprises contacting a compound of the formula:

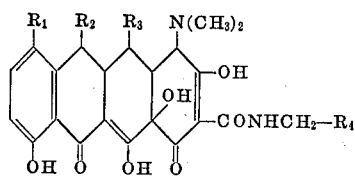

wherein $R_1$, $R_2$ and $R_3$ are as hereinabove defined and $R_4$ is selected from the group consisting of —NHCOCF$_3$,

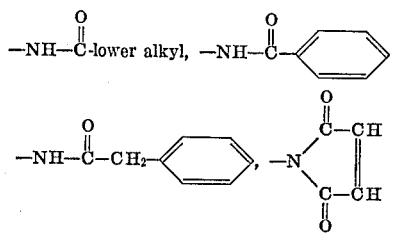

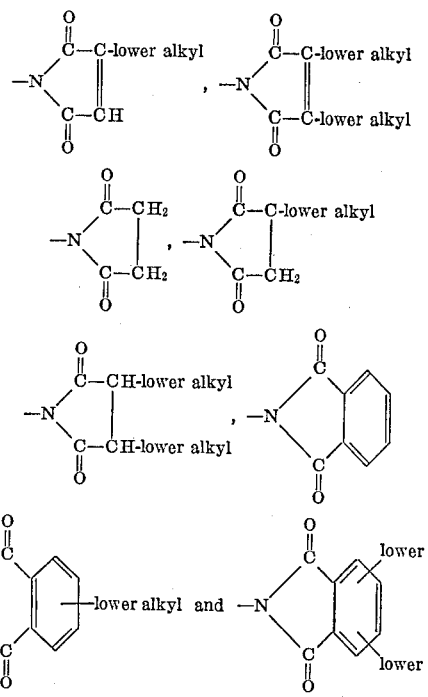

with 0.05 N to 0.50 N aqueous sodium hydroxide.

4. A process according to claim 3 wherein $R_1$, $R_2$ and $R_3$ are hydrogen; $R_4$ is trifluoroacetamido; and the aqueous sodium hydroxide is about 0.10 N.

References Cited

UNITED STATES PATENTS 3,272,817   9/1966   Gordon et al. _____ 260—559
3,275,652   9/1966   Martell et al. _____ 260—559

ALEX MAZEL, *Primary Examiner.*

ANNE MARIE TIGHE, *Assistant Examiner.*